(12) United States Patent
Rajendran et al.

(10) Patent No.: US 10,800,413 B2
(45) Date of Patent: Oct. 13, 2020

(54) SYSTEM FOR DETERMINING A CHARGING PROFILE FOR AN ELECTRIC VEHICLE AND METHOD THEREOF

(71) Applicant: HONDA MOTOR CO., LTD., Tokyo (JP)

(72) Inventors: Aparajithan Rajendran, Torrance, CA (US); Narendran Ravi, Torrance, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 288 days.

(21) Appl. No.: 15/785,021

(22) Filed: Oct. 16, 2017

(65) Prior Publication Data

US 2019/0111924 A1 Apr. 18, 2019

(51) Int. Cl.
*B60W 30/18* (2012.01)
*B60L 58/12* (2019.01)

(52) U.S. Cl.
CPC ............ *B60W 30/18* (2013.01); *B60L 58/12* (2019.02); *B60W 2510/244* (2013.01); *B60W 2520/06* (2013.01); *B60W 2520/105* (2013.01); *B60W 2556/50* (2020.02)

(58) Field of Classification Search
CPC ............ B60W 30/18; B60W 2520/06; B60W 2510/244; B60W 2520/105; B60W 2550/402; B60L 58/12
See application file for complete search history.

(56) References Cited

U.S. PATENT DOCUMENTS

| | | | |
|---|---|---|---|
| 8,538,621 B2 | 9/2013 | Ross et al. | |
| 9,114,794 B2 | 8/2015 | King et al. | |
| 9,409,563 B2 | 8/2016 | Yu et al. | |
| 9,637,019 B2 | 5/2017 | Bassham et al. | |
| 10,065,517 B1* | 9/2018 | Konrardy | B60L 53/36 |
| 2009/0210357 A1* | 8/2009 | Pudar | B60L 11/1842 705/412 |
| 2010/0174484 A1* | 7/2010 | Sivasubramaniam | B60L 7/10 701/469 |
| 2010/0217485 A1* | 8/2010 | Ichishi | B60L 58/12 701/36 |
| 2010/0318250 A1* | 12/2010 | Mitsutani | B60K 1/02 701/22 |

(Continued)

FOREIGN PATENT DOCUMENTS

DE 102013008716 A1 11/2014

OTHER PUBLICATIONS

Ashtari, A., et. al., "PEV Charging Profile Prediction and Analysis Based on Vehicle Usage Data," IEEE Transactions on Smart Grid, vol. 3, No. 1, Mar. 2012.

*Primary Examiner* — Jason Holloway
(74) *Attorney, Agent, or Firm* — Arent Fox LLP (57) ABSTRACT

An electric vehicle can be operated according to a charging profile. A location of an electric vehicle and a time period corresponding to the location of the electric vehicle can be determined during a driving operation of an electric vehicle. A charging profile for the electric vehicle can be selected during the driving operation of the electric vehicle and based at least in part on the location and the time period. One or more functions corresponding to the charging profile can be performed on the electric vehicle and based on selecting the charging profile.

20 Claims, 5 Drawing Sheets

(56) References Cited

U.S. PATENT DOCUMENTS

| | | | |
|---|---|---|---|
| 2011/0166731 A1* | 7/2011 | Kristinsson | B60W 10/08 |
| | | | 701/22 |
| 2012/0065831 A1* | 3/2012 | Ross | B60L 15/2045 |
| | | | 701/29.1 |
| 2013/0079962 A1* | 3/2013 | Ishikawa | B60L 15/2045 |
| | | | 701/22 |
| 2013/0175974 A1* | 7/2013 | Bassham | B60L 58/12 |
| | | | 320/106 |
| 2014/0091747 A1* | 4/2014 | Uyeki | B60L 53/68 |
| | | | 320/101 |
| 2016/0001656 A1* | 1/2016 | Korenaga | H01M 10/4207 |
| | | | 701/22 |
| 2016/0318501 A1* | 11/2016 | Oldridge | B60L 15/2045 |

\* cited by examiner

SYSTEM FOR DETERMINING A CHARGING PROFILE FOR AN ELECTRIC VEHICLE AND METHOD THEREOF

BACKGROUND

Electronic vehicles have been gaining popularity as a primary mode of transportation, and as such, many public places have installed charging stations to allow drivers to charge electronic vehicles while parked. In this regard, not only can the drivers charge their electronic vehicles at home, but can also charge at a parking spot at an office, shopping mall, city center, or other areas having parking spaces with installed charging stations. Vehicles, in general, can also be equipped with location determining systems, such as a global positioning system (GPS) device, a corresponding navigation infotainment system, etc., which can be used to identify locations of charging stations for electronic vehicles, and/or a charging station being used by the electronic vehicles.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method for operating an electric vehicle according to a charging profile is provided. The method includes determining, during a driving operation of an electric vehicle, a location of the electric vehicle and a time period corresponding to the location of the electric vehicle. The method also includes selecting, during the driving operation of the electric vehicle and based at least in part on the location and the time period, a charging profile for the electric vehicle, and performing, on the electric vehicle and based on selecting the charging profile, one or more functions corresponding to the charging profile.

In another example, a vehicle is provided that includes a vehicle charging profile system, which includes a memory, and at least one processor coupled to the memory. The at least one processor is configured to determine, during a driving operation of an electric vehicle, a location of the electric vehicle and a time period corresponding to the location of the electric vehicle, select, during the driving operation of the electric vehicle and based at least in part on the location and the time period, a charging profile for the electric vehicle, and perform, on the electric vehicle and based on selecting the charging profile, one or more functions corresponding to the charging profile.

In a further example, a non-transitory computer-readable medium storing computer executable code for operating an electric vehicle according to a charging profile is provided. The code includes code for determining, during a driving operation of an electric vehicle, a location of the electric vehicle and a time period corresponding to the location of the electric vehicle, selecting, during the driving operation of the electric vehicle and based at least in part on the location and the time period, a charging profile for the electric vehicle, and performing, on the electric vehicle and based on selecting the charging profile, one or more functions corresponding to the charging profile.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "charging profile," as used herein, can include a collection of parameters and corresponding data values related to charging an electronic vehicle. The charging profile can be stored in a memory of the electronic vehicle and/or at a remote location, and can include parameters such as a charging location at which the electronic vehicle can charge a battery, a start time and/or duration of one or more charging operations performed for the electronic vehicle at the charging location, and/or similar parameters.

The term "electronic vehicle," as used herein, can refer to any moving vehicle that is capable of carrying one or more human occupants and is powered by an electronic battery and/or any form of energy that can be recharged at a charging station. The term "electronic vehicle" can include, but is not limited to: cars, trucks, vans, minivans, SUVs, motorcycles, scooters, boats, personal watercraft, and aircraft.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "telematics system," as used herein, can refer to a system that facilitates intercommunication among vehicle systems, communication with the vehicle systems via one or more other systems or devices, etc. In an example, telematics systems can interface with other systems, such as a remote device, other computers, etc., via a wireless communication technology, such as a cellular technology, Bluetooth, etc. using a corresponding modem or transceiver.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls, etc.), vehicle audio systems, vehicle security systems, vehicle video systems, vehicle infotainment systems, vehicle telephone systems, and the like.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Figure 1:
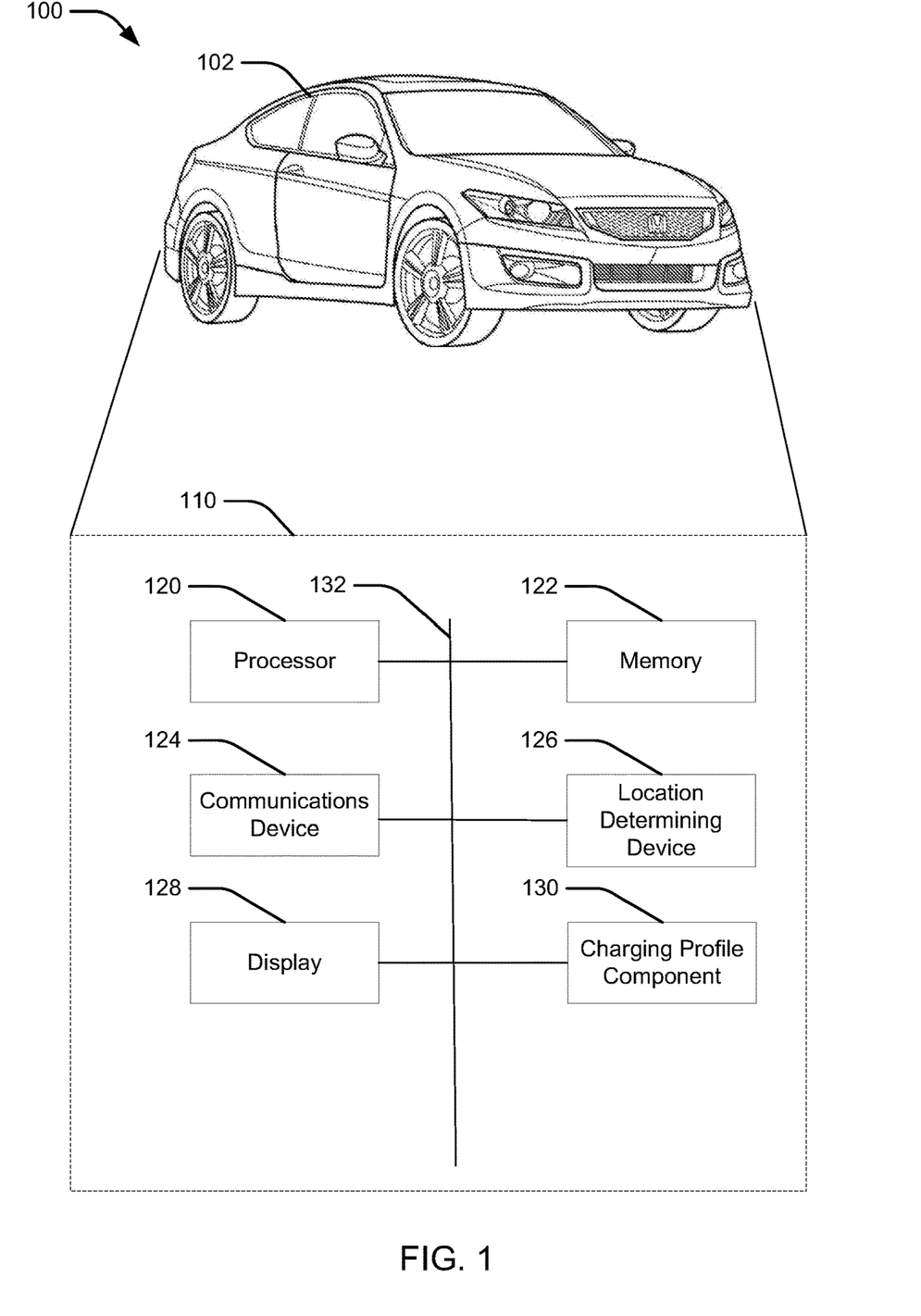
FIG. 1 illustrates a schematic view of an example operating environment of a vehicle charging profile system according to one aspect of the disclosure.

FIG. 1 shows a schematic view of an example operating environment 100 of a vehicle charging profile system 110 and example methods according to aspects described herein. For example, operating environment 100 can include a vehicle 102 within which the vehicle charging profile system 110 can at least partially reside and/or be implemented. Components of the vehicle charging profile system 110, as well as the components of other systems, hardware architectures and software architectures discussed herein, can be combined, omitted or organized into different architectures for various aspects of the disclosure. However, the example aspects and configurations discussed herein focus on the operating environment 100 as illustrated in FIG. 1, with corresponding system components and related methods.

The vehicle charging profile system 110 can include or be operably coupled with (or executed by) one or more processors 120 and one or more memories 122 that communicate to effectuate certain functions or actions, as described herein. For example, the vehicle charging profile system 110 can include a communications device 124, which can include substantially any wired or wireless device, or related modem, etc., for providing wired or wireless computer communications utilizing various protocols to send/receive electronic signals internally to features and systems within the vehicle 102 and/or to external devices. In an example, communications device 124 can communicate using one or more radio technologies (e.g., 3GPP radio access technologies, IEEE 802.11, Bluetooth®, etc.). The vehicle charging profile system 110 can additionally include or be operably coupled with a location determining device 126 for determining a location of the vehicle 102 and/or one or more location-related parameters, such as speed, acceleration, etc.

For example, location determining device 126 can include or can be operably coupled with a global positioning system (GPS) device (or other latitude/longitude determination device), a speedometer, an accelerometer, a gyroscope, and/or the like, to determine the location-related parameters.

Additionally, the vehicle charging profile system 110 can include a display 128 for displaying one or more interfaces related to one or more charging profiles. For example, display 128 can include a liquid crystal display (LCD) and/or variants thereof, plasma display, etc., and/or can be part of a touchscreen display. In some examples, one or more of the components described for the vehicle charging profile system 110 can be part of another system. For example, display 128 can be part of an infotainment system of the vehicle 102. Similarly, location determining device 126 can be part of a navigation system of the vehicle 102, etc. Moreover, the various components of the vehicle charging profile system 110 can be operably coupled to one another via one or more busses 132 to facilitate communication among the components to perform functions described herein.

In addition, for example, vehicle charging profile system 110 can include a charging profile component 130 to manage generating, maintaining, storing, etc., multiple charging profiles for the vehicle 102. For example, the charging profiles can correspond to a charging location where a charging operation (e.g., to charge a battery of the vehicle 102) is performed, which is referred to herein as a profile location as relating to the charging profile. The charging profiles can also include corresponding start times, duration, etc., an average or otherwise modeled start time, duration, etc., and/or the like, of charging performed for the vehicle 102. In other examples, the charging profiles can include additional charging parameters, such as a charging speed, a battery level when charging commences, a charging outlet type, a charging cost (e.g., dollars per hour), etc., associated with the charging location and/or with charging station(s) at the charging location. As described further herein, the charging profile component 130 can, during charging operations for the vehicle 102, generate charging profiles and corresponding profile locations. In addition, the charging profile component 130 can, during driving operations for the vehicle 102, determine an applicable charging profile for the vehicle 102 based on a current or predicted location of the vehicle 102, a time period corresponding to the current or predicted location, etc.

Figure 2:
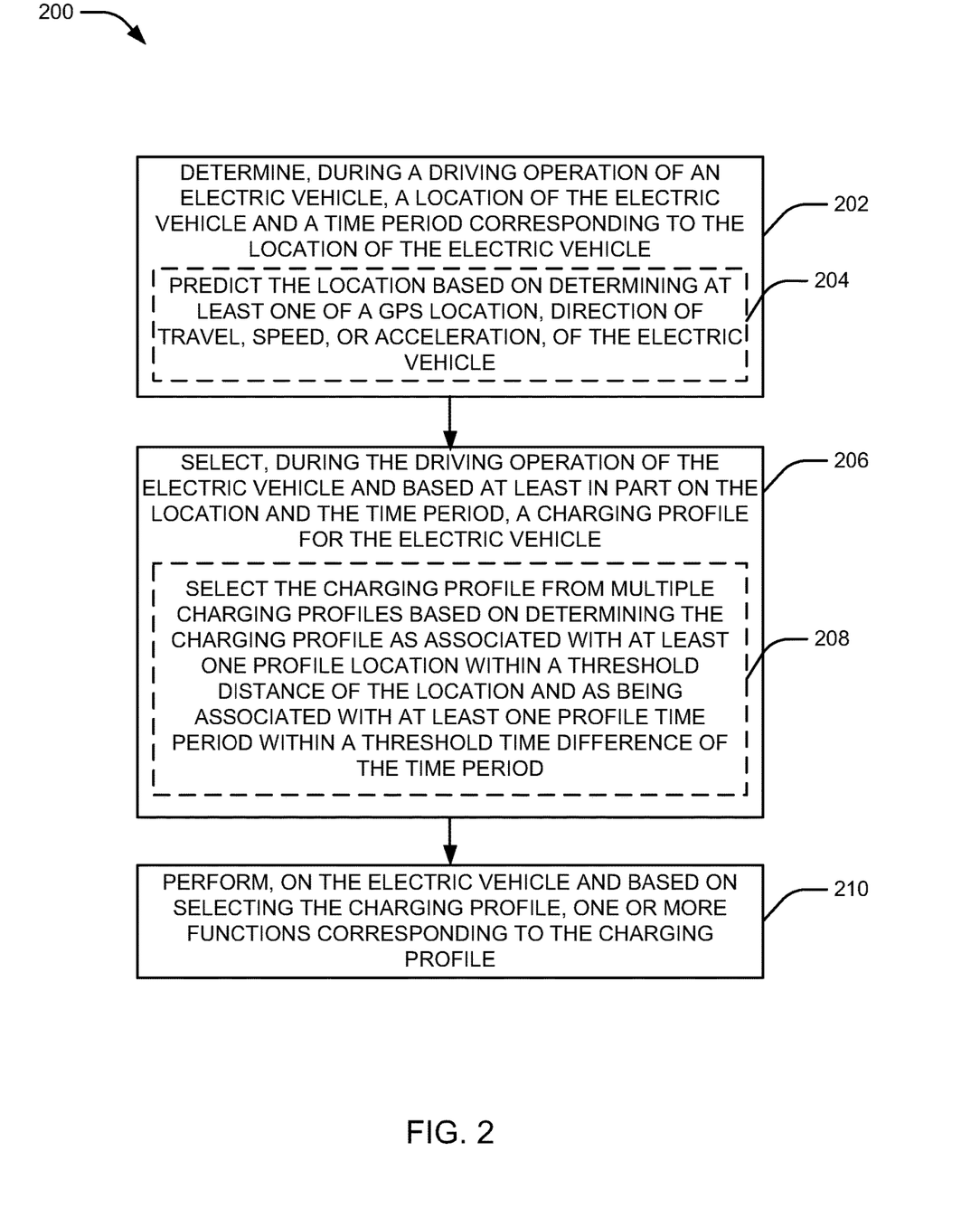
FIG. 2 illustrates a flowchart showing an example method for selecting a charging profile for an electric vehicle according to one aspect of the disclosure.

Referring now to FIG. 2, which is described in conjunction with the example operating environment 100 of FIG. 1, an example method 200 for selecting a charging profile for a vehicle (e.g., which can be used by the vehicle charging profile system 110) is illustrated. In block 202, the method 200 can include determining, during a driving operation of an electric vehicle, a location of the electric vehicle and a time period corresponding to the location of the electric vehicle. In an aspect, vehicle charging profile system 110 (e.g., in conjunction with processor 120, memory 122, communications device 124, and/or location determining device 126) can determine, during the driving operation of the electric vehicle 102, the location of the electric vehicle 102 and the time period corresponding to the location of the electric vehicle 102. For example, vehicle charging profile system 110 can determine the location of the electric vehicle 102 periodically (e.g., according to a GPS sampling period or other defined period of time), based on one or more detected events (e.g., a battery capacity event, a detected time of day, etc.), and/or the like. In addition, the vehicle charging profile system 110 can determine the time period associated with the determined location as a time of day, day of week, day of month, whether the day is a weekday or weekend day, etc. In one example, vehicle charging profile system 110 can predict a future location of the electric vehicle 102 based on determined driving habits/patterns. For example, the driving habits/patterns can be determined based on a GPS location, direction of travel, speed, acceleration, historical speed/acceleration, etc., as described in further detail below. In another example, the driving habits/patterns can be associated with the charging profiles, as described further below, such as using the profile location and/or associated profile time periods (e.g., the electric vehicle 102 can be determined to be typically located at the profile location during the associated profile time periods). In an example, the profile time period(s) may include or otherwise be determined from profile start times recorded from previous charging operations.

In an example, determining the location of the electric vehicle in block 202 can optionally include, in block 204, predicting the location based on determining at least one of a GPS location, direction of travel, speed, or acceleration, of the electric vehicle. In an aspect, vehicle charging profile system 110 (e.g., in conjunction with processor 120, memory 122, and/or location determining device 126) can predict the location based on determining at least one of the GPS location, direction of travel, speed, or acceleration, of the electric vehicle 102. Thus, for example, vehicle charging profile system 110 can predict the location based on a received location from a GPS device on the electric vehicle 102, based on a direction of travel (which can be determined by, and/or deduced based on data from, the GPS device), based on a speed of the electric vehicle 102 (which can be determined from the GPS device and/or a speedometer via a telematics system interface), based on an acceleration of the electric vehicle 102 (which can be determined from the GPS device and/or a speedometer via a telematics system interface), and/or the like.

In an example, predicting the location of the electric vehicle 102 can correspond to predicting the location at a time period in the future. In this example, vehicle charging profile system 110 can predict the future location of the electric vehicle 102 based on the GPS location and the direction of travel (and/or the speed/acceleration) by determining the future location starting from the GPS location and in the direction of travel of the vehicle. In addition, in an example, vehicle charging profile system 110 can model previous locations and corresponding routes, and can predict (e.g., within a threshold certainty) that the electric vehicle 102 is on a route to the future location. Vehicle charging profile system 110 can also, in this example, predict the time period at which the electric vehicle 102 is to arrive at the future location, which can be based on previous route times, current traffic and predicted route times as applied to the previous route times or otherwise, etc.

In another example, vehicle charging profile system 110 can determine a location, or predict a location, of the vehicle based on a location determined and provided by a mobile device or other device of the driver (which is not shown). In this example, the mobile device or other device of the driver can communicate with the vehicle charging profile system 110 via communications device 124 (e.g., via a mobile network or short-range communications, such as Bluetooth, RFID, NFC, etc.).

In block 206, the method 200 can include selecting, during the driving operation of the electric vehicle and based at least in part on the location and the time period, a charging profile for the electric vehicle. In an aspect, vehicle charging profile system 110 (e.g., in conjunction with processor 120 and/or memory 122) can select, during the driving operation of the electric vehicle and based at least in part on the location and the time period, the charging profile for the electric vehicle 102. For example, vehicle charging profile system 110 can select the charging profile based on comparing one or more of the location and/or the time period to profile locations and/or profile time periods associated with multiple charging profiles stored (e.g., in memory 122), or otherwise accessible by, the vehicle charging profile system 110.

In this regard, for example, selecting the charging profile at block 206 can optionally include, at block 208, selecting the charging profile from multiple charging profiles based on determining the charging profile as associated with at least one profile location within a threshold distance of the location and as being associated with at least one profile time period within a threshold time difference of the time period. In an aspect, vehicle charging profile system 110 (e.g., in conjunction with processor 120 and/or memory 122) can select the charging profile from the multiple charging profiles (e.g., stored in memory 122) based on determining the charging profile as associated with at least one profile location within a threshold distance of the location and as being associated with at least one profile time period within a threshold time difference of the time period. Thus, for example, vehicle charging profile system 110 can compare the determined location of the electric vehicle 102 and/or the associated time period to a profile location and/or profile time period associated with multiple charging profiles to determine a charging profile for selection.

For example, vehicle charging profile system 110 can determine a charging profile (or filter one or more profiles from a set of multiple profiles) that is (are) associated with a profile location that is a threshold distance from the current or predicted location, described above. In addition, vehicle charging profile system 110 can determine a charging profile (or filter one or more profiles from a set of multiple profiles) that is associated with a profile time period that is within a threshold duration from the time period associated with the current or predicted location, described above. In an example, vehicle charging profile system 110 can determine to evaluate the charging profiles for selection each time the location is determined, based on detecting the electric vehicle 102 is (or is predicted to be) within a threshold distance of the profile location associated with one of the multiple charging profiles, based on detecting the time period associated with the location or predicted location (or a current time) is within a threshold duration of a profile time period associated with one of the multiple charging profiles, etc.

Moreover, as described further herein, parameters associated with the charging profiles can be modeled to provide a range of locations (or routes), a range of time periods, etc. In one example, the selected charging profile can have one or more associated routes from a location to the associated charging location (e.g., modeled based on previous arrivals to the charging location). In this example, vehicle charging profile system 110 can determine that a current route of the electric vehicle 102 during the driving operation is similar to a route associated with the charging profile, and can accordingly select the charging profile based on the determination (and/or a determination regarding a current time, or predicted time of arrival, and one or more profile time periods associated with the charging profile).

In block 210, the method 200 can include performing, on the electric vehicle and based on selecting the charging profile, one or more functions corresponding to the charging profile. In an aspect, vehicle charging profile system 110 (e.g., in conjunction with processor 120, memory 122, communications device 124, display 128, etc.) can perform, on the electric vehicle 102 and based on selecting the charging profile, one or more functions corresponding to the charging profile. For example, vehicle charging profile system 110 can load the charging profile in an application executing on the processor 120 (e.g., an infotainment or navigation system) based on selecting the charging profile. The application can perform one or more additional functions based on the loaded charging profile, such as rendering a reminder, e.g., on display 128, to perform a charging operation for the vehicle. For example, the application can deliver the reminder before the electric vehicle 102 reaches the profile location, and the reminder can relate to performing the charging operation upon arriving at the associated profile location. In another example, vehicle charging profile system 110 can provide the charging profile, and/or related parameter values, to another component of the electric vehicle 102 to cause other actions based on predicted arrival of the electric vehicle 102 at the profile location (e.g., for performing the charging operation). In any case, performing the one or more functions can include activating the charging profile for one or more components of the electric vehicle 102, communicating one or more parameter of the charging profile to a remote device for indicating the current charging profile associated with the electric vehicle 102, and/or the like.

Figure 3:
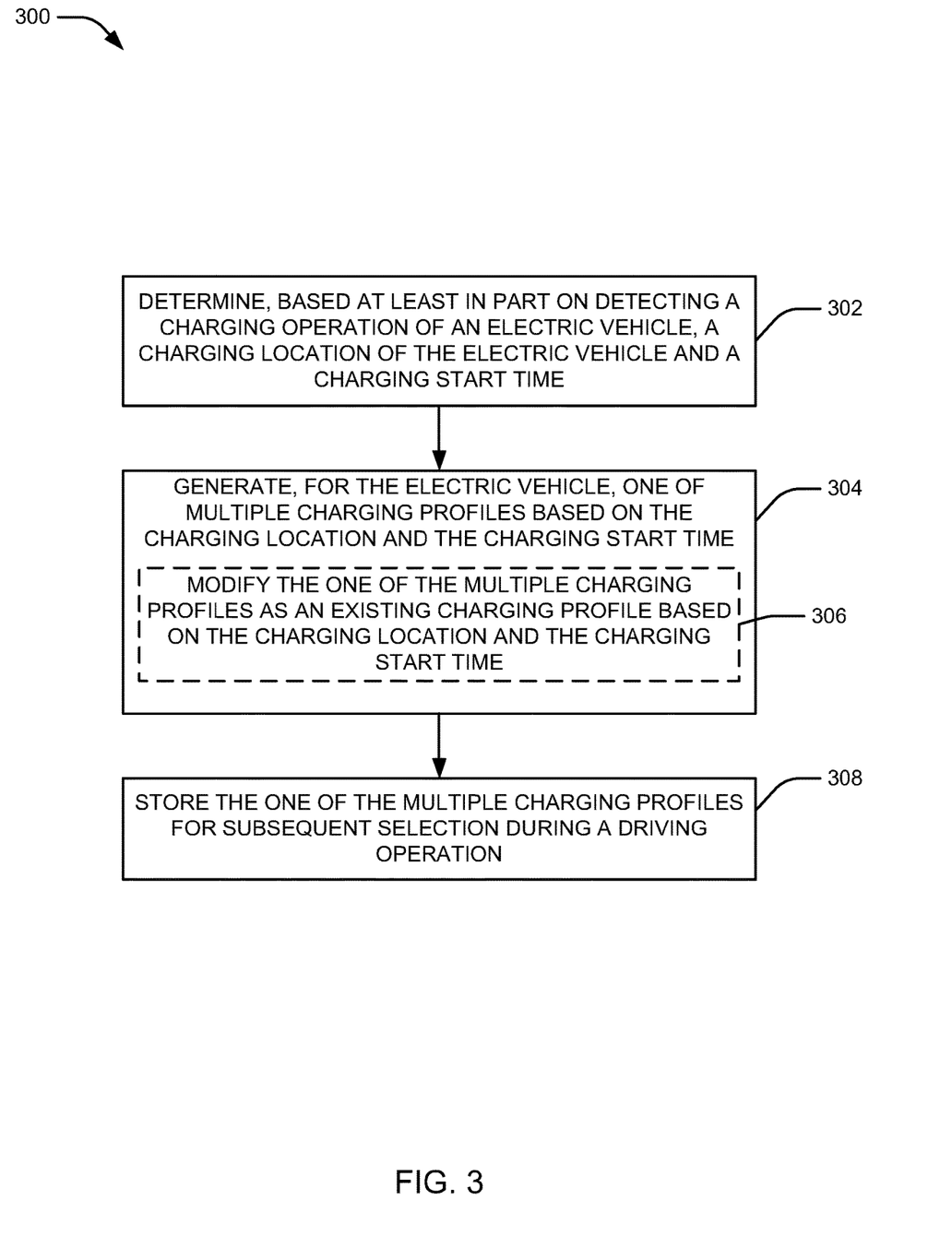
FIG. 3 illustrates a flowchart showing an example method for generating a charging profile for an electric vehicle according to one aspect of the disclosure.

Referring now to FIG. 3, which is described in conjunction with the example operating environment 100 of FIG. 1, an example method 300 for generating a charging profile for a vehicle (e.g., which can be used by the vehicle charging profile system 110) is illustrated. In block 302, the method 300 can include determining, based at least in part on detecting a charging operation of an electric vehicle, a charging location of the electric vehicle and a charging start time. In an aspect, vehicle charging profile system 110 (e.g., in conjunction with processor 120, memory 122, and/or location determining device 126) can determine, based at least in part on detecting the charging operation of the electric vehicle 102, the charging location of the electric vehicle 102 and the charging start time. For example, vehicle charging profile system 110 can detect initiation of a charging operation (e.g., via coupling with one or more electronic systems used in charging the electric vehicle 102), such as when the vehicle is plugged into or otherwise coupled with the charging station, when the charging station begins supplying power to the electric vehicle 102, etc., and can accordingly determine the location of the electric vehicle at or near that time (e.g., via GPS location) and a start time of the charging operation. In addition, vehicle charging profile system 110 can determine one or more other parameters related to the charging process as well, such as a charging duration, a battery level at the time of charging, an outlet type at the charging location, a charging cost, locations of the electric vehicle 102 along a route to the charging location, etc.

In block 304, the method 300 can include generating, for the electric vehicle, one of multiple charging profiles based on the charging location and the charging start time. In an aspect, vehicle charging profile system 110 (e.g., in conjunction with processor 120 and/or memory 122) can generate, for the electric vehicle 102, one of multiple charging profiles based on the charging location and the charging start time. For example, where a charging profile does not exist (e.g., in memory 122, at a remote device accessible by the electric vehicle 102 via communications device 124, etc.) for the charging location, vehicle charging profile system 110 can create the charging profile, and can associate the charging profile with the charging location and charging start time (and/or other parameters that vehicle charging profile system 110 can determine, as described above).

Additionally, generating the one of multiple charging profiles in block 304 can optionally include, in block 306, modifying the one of the multiple charging profiles as an existing charging profile based on the charging location and the charging start time. In an aspect, vehicle charging profile system 110 (e.g., in conjunction with processor 120 and/or memory 122) can modify the one of the multiple charging profiles as an existing charging profile based on the charging location and the charging start time. For example, vehicle charging profile system 110 can obtain the charging profile based on the charging location, and can store the start time and/or other parameters in the charging profile. In one example, vehicle charging profile system 110 can model parameters of the charging profile, such as the profile time period, based on the determined charging parameters, such as the charging start time. For example, the charging profile can include a profile time period corresponding to typical time periods during which the electric vehicle 102 is charged at the charging location. Thus, for example, vehicle charging profile system 110 can update the charging profile with the charging start time of a current charging operation.

In another example, vehicle charging profile system 110 can model the profile time period based on previous charging start times and the charging start time of the current charging operation to determine a pattern or an approximate time period during which charging typically occurs at the charging location. For example, vehicle charging profile system 110 can model the profile time period based on time of day, day of week, day of month, whether the day is a weekday or weekend day, etc. of the charging start time to determine one or more profile time periods (e.g., a scheduled of time periods) expected for charging the electric vehicle 102. For example, the electric vehicle 102 can be charged at a certain charging location (e.g., a home of a driver of the electric vehicle 102) nearly every weekday at 6:00 p.m. In this example, vehicle charging profile system 110 can detect initiation of a charging operation on most weekdays at 6:00 p.m., e.g., over a period of a number of weeks, and can determine the profile time period for the charging location to include a start time of 6:00 p.m. on weekdays. For example, vehicle charging profile system 110 can determine the profile time period(s) as a schedule of times of certain days, etc., based on detecting statistically significant charging start times at the charging location over a span of time.

In another example, vehicle charging profile system 110 can detect a driving behavior before arrival at the charging location, such as a number of locations along a route to the charging location, and can associate this information with the charging profile as well. For example, vehicle charging profile system 110 can determine (e.g., for one or more associated profile time periods or otherwise) the route of the electric vehicle 102 before arriving at the charging location based on detecting a history of a statistically significant number of similar routes before arrival at the charging location. These parameters, along with parameters observed during a driving operation of the electric vehicle 102, can facilitate determining a charging profile for the electric vehicle 102. For example, as described above, vehicle charging profile system 110 can detect a current location of the electric vehicle 102 within a threshold distance of the profile location associated with the charging profile and/or at a time within a threshold duration of one or more profile time periods associated with the charging profile, etc. In addition, in an example, vehicle charging profile system 110 can detect that the electric vehicle 102 is on a route similar to a profile route associated with the charging profile (e.g., at or near a profile time period or otherwise).

In block 308, the method 300 can include storing the one of the multiple charging profiles for subsequent selection during a driving operation. In an aspect, vehicle charging profile system 110 (e.g., in conjunction with processor 120, memory 122, and/or communications device 124) can store the one of the multiple charging profiles for subsequent selection during the driving operation. For example, vehicle charging profile system 110 can store the charging profile or update the charging profile in memory 122 or another repository local to the electric vehicle 102. In another example, vehicle charging profile system 110 can store the charging profile or update the charging profile by communication with a remote device, such as a server, a mobile device associated with the driver, etc., using communications device 124 to communicate with the server, mobile device, etc., using network-based communications, short-range wireless communications such as WLAN, Bluetooth, RFID, NFC, etc., and/or the like.

In one specific example, vehicle charging profile system 110 can make predictions on charging profiles, which can be loaded while driving to provide one or more functions, based on driving patterns. For example, depending on detected driving habits (e.g., location, route, speed, acceleration, time of day, day of week, day of month, etc.), a charging profile can be selected and loaded (or preloaded) to vehicle charging profile system 110 (e.g., as described in method 200). Active profiling can occur, for example, when the electric vehicle 102 actually plugs into a charging station at a location to receive power for charging (e.g., as described in method 300). Upcoming charging profiles can correspond to predictions made based on driving habits.

In a first specific example, the driver (e.g., and the electric vehicle 102) can be at a shopping mall where the electric vehicle 102 can be plugged into a charging station for charging. In a typical pattern, the driver can be at the mall at 5:30 p.m. and can start driving home at 5:45 p.m. The pattern dictates that the driver (and electric vehicle 102) are usually at home from 6:00 p.m. to 8:00 a.m. Often times, this schedule is repeated, and the repetition can be detected for creating and/or updating a charging profile for home. Thus, in one example, vehicle charging profile system 110 can accordingly create a charging profile for the mall and home. Additionally, latitude and longitude coordinates can be stored in the respective charging profiles. Then, based on where the driver (and electric vehicle 102) are on the road at around 5:55 p.m., vehicle charging profile system 110 can determine that the driver is on the way home. Vehicle charging profile system 110 can also determine, based on the home charging profile, that the driver usually plugs in the electric vehicle 102 for charging at home. Thus, based on determining a location of the electric vehicle 102 near home at a time near a typical time for starting charging (e.g., based on the data in the home charging profile), vehicle charging profile system 110 can load the home charging profile for performing one or more related functions. For example, vehicle charging profile system 110 can render a reminder (e.g., via display 128) to notify the driver to plug in at home based on the driving prediction when the driver arrives at home (e.g., the location associated with the home charging profile).

In another specific example, the driver can have taken a night job and is typically out of the house from 6:00 p.m. to 8:00 a.m. Vehicle charging profile system 110 can automatically detect this change over time by updating the home charging profile to include start times around 8:00 a.m. (e.g., when the driver arrives at home). As the driver continues to charge around 8:00 a.m., the start time for the home charging location can trend towards this time, such to allow the vehicle charging profile system 110 to load the profile when detecting that the electric vehicle 102 is within a threshold distance (e.g., or on a route to, etc.) home.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 400 is shown in FIG. 4.

Figure 4:
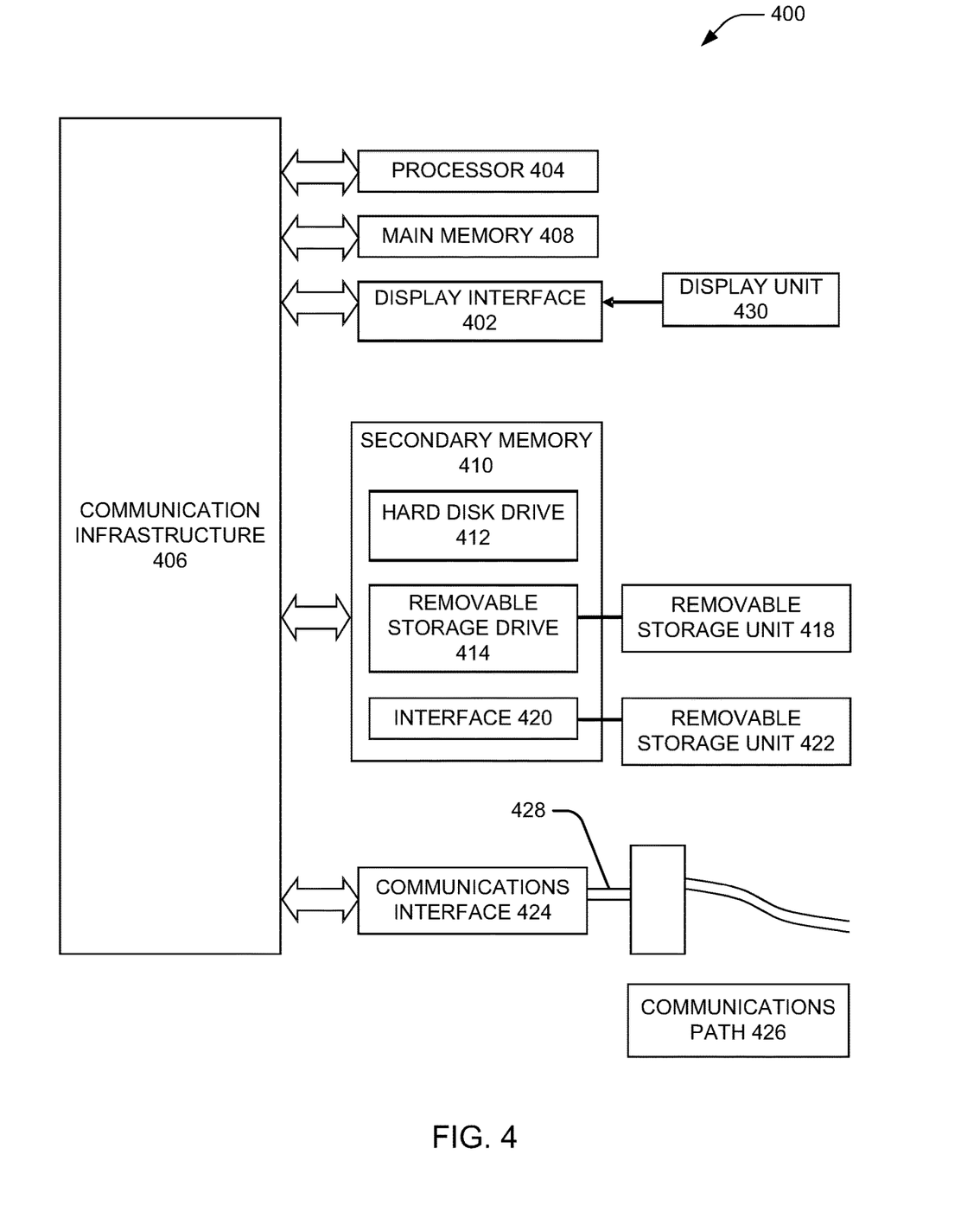
FIG. 4 presents an example system diagram of various hardware components and other features according to one aspect of the disclosure.

FIG. 4 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). In one example, processor 120 can include processor 404. Various software aspects are described in terms of this example computer system. After reading this description, it will become apparent to a person skilled in the relevant art(s) how to implement aspects described herein using other computer systems and/or architectures.

Computer system 400 can include a display interface 402 that forwards graphics, text, and other data from the communication infrastructure 406 (or from a frame buffer not shown) for display on a display unit 430. Display unit 430 can include display 128, in one example. Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 can include other similar devices for allowing computer programs or other instructions to be loaded into computer system 400. Such devices can include, for example, a removable storage unit 422 and an interface 420. Examples of such can include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400. In an example, memory 122 can include one or more of main memory 408, secondary memory 410, removable storage drive 414, removable storage unit 418, removable storage unit 422, etc.

Computer system 400 can also include a communications interface 424. Communications interface 424 allows software and data to be transferred between computer system 400 and external devices. Examples of communications interface 424 can include a modem, a network interface (such as an Ethernet card), a communications port, a Personal Computer Memory Card International Association (PCMCIA) slot and card, etc. Software and data transferred via communications interface 424 are in the form of signals 428, which can be electronic, electromagnetic, optical or other signals capable of being received by communications interface 424. These signals 428 are provided to communications interface 424 via a communications path (e.g., channel) 426. This path 426 carries signals 428 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive, a hard disk installed in a hard disk drive, and/or signals 428. These computer program products provide software to the computer system 400. Aspects described herein can be directed to such computer program products. Communications device 124 can include communications interface 424.

Computer programs (also referred to as computer control logic) are stored in main memory 408 and/or secondary memory 410. Computer programs can also be received via communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. Computer programs can include vehicle charging profile system 110.

In variations where aspects described herein are implemented using software, the software can be stored in a computer program product and loaded into computer system 400 using removable storage drive 414, hard disk drive 412, or communications interface 420. The control logic (software), when executed by the processor 404, causes the processor 404 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
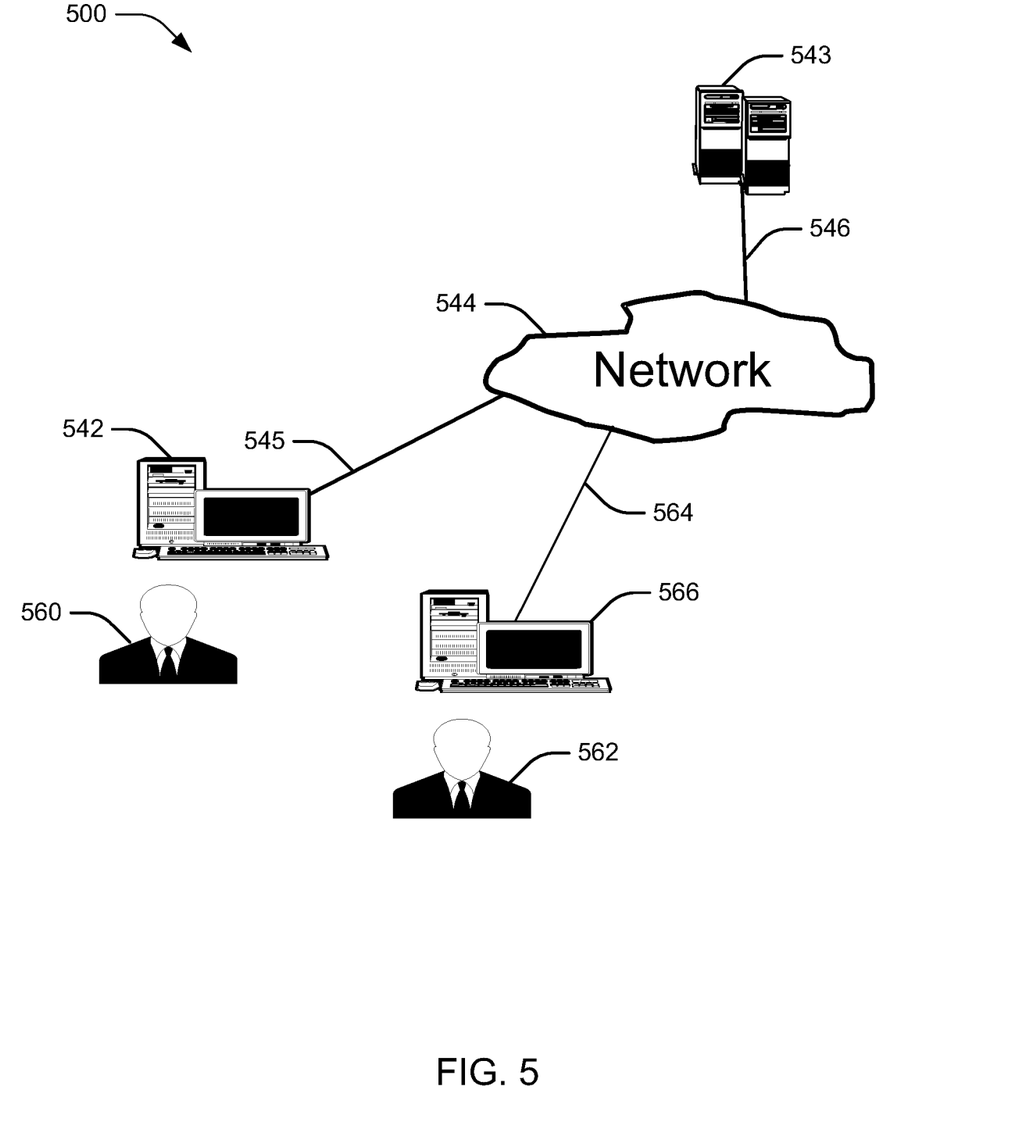
FIG. 5 is a block diagram of various example system components according to one aspect of the disclosure.

FIG. 5 is a block diagram of various example system components, in accordance with an aspect. FIG. 5 shows a communication system 500 usable in accordance with aspects described herein. The communication system 500 includes one or more accessors 560, 562 (also referred to interchangeably herein as one or more "users") and one or more terminals 542, 566. For example, terminals 542, 566 can include vehicle 102 or a related system (e.g., vehicle charging profile system 110, processor 120, communications device 124, etc.), and/or the like. In one aspect, data for use in accordance with aspects described herein is, for example, input and/or accessed by accessors 560, 562 via terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, for example, a network 544, such as the Internet or an intranet, and couplings 545, 546, 564. The couplings 545, 546, 564 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for operating an electric vehicle according to a charging profile, comprising:
    determining, by a processor in the electric vehicle while driving an electric vehicle, a location of the electric vehicle and a time period corresponding to the location of the electric vehicle;
    selecting, by the processor in the electric vehicle while driving the electric vehicle and based at least in part on the location and the time period, the charging profile for the electric vehicle, wherein the charging profile relates to performing a charging operation for the electric vehicle based on arriving at an associated profile location; and
    performing, by the processor in the electric vehicle, while driving the electric vehicle, and based on selecting the charging profile, one or more functions corresponding to the charging profile.

2. The method of claim 1, wherein selecting the charging profile is based at least in part on determining the charging profile from multiple charging profiles as being associated with the associated profile location within a threshold distance of the location and as being associated with at least one profile time period within a threshold time difference of the time period.

3. The method of claim 1, wherein determining the location of the electric vehicle comprises predicting the location of the electric vehicle based on determining at least one of a global positioning system (GPS) position of the electric vehicle, a direction of travel of the electric vehicle, or a speed or acceleration of the electric vehicle.

4. The method of claim 1, wherein the time period indicates at least one of a time of day, a day of a week, a day of a month, or a day as being a weekday or a weekend day, and wherein selecting the charging profile is based at least in part on determining the charging profile from multiple charging profiles as being associated with the time of day, the day of the week, the day of the month, or the weekday or the weekend day.

5. The method of claim 1, further comprising:
    determining, based at least in part on detecting a charging operation of the electric vehicle, a charging location of the electric vehicle and a charging start time;
    generating, for the electric vehicle, one of multiple charging profiles based on the charging location and the charging start time; and
    storing the one of the multiple charging profiles for subsequent selection during driving of the electric vehicle.

6. The method of claim 5, wherein the charging profile corresponds to the one of the multiple charging profiles.

7. The method of claim 5, wherein generating the one of the multiple charging profiles includes updating at least a profile location and a profile time period of the one of the multiple charging profiles based on the charging location and the charging start time.

8. The method of claim 1, wherein performing the one or more functions comprises providing a reminder to charge the electric vehicle upon or before arrival at a charging location associated with the charging profile.

9. A vehicle comprising:
    a vehicle charging profile system, comprising:
        a memory; and
        at least one processor coupled to the memory, wherein the at least one processor is configured to:
            determine, while driving an electric vehicle, a location of the electric vehicle and a time period corresponding to the location of the electric vehicle;
            select, while driving the electric vehicle and based at least in part on the location and the time period, the charging profile for the electric vehicle, wherein the charging profile relates to performing a charging operation for the electric vehicle based on arriving at an associated profile location; and
            perform, on the electric vehicle, while driving the electric vehicle, and based on selecting the charging profile, one or more functions corresponding to the charging profile.

10. The vehicle of claim 9, wherein the at least one processor is configured to select the charging profile based at least in part on determining the charging profile from multiple charging profiles as being associated with the associated profile location within a threshold distance of the location and as being associated with at least one profile time period within a threshold time difference of the time period.

11. The vehicle of claim 9, wherein the at least one processor is configured to determine the location of the electric vehicle at least in part by predicting the location of the electric vehicle based on determining at least one of a global positioning system (GPS) position of the electric vehicle, a direction of travel of the electric vehicle, or a speed or acceleration of the electric vehicle.

12. The vehicle of claim 9, wherein the time period indicates at least one of a time of day, a day of a week, a day of a month, or a day as being a weekday or a weekend day, and wherein the at least one processor is configured to select the charging profile based at least in part on determining the charging profile from multiple charging profiles as being associated with the time of day, the day of the week, the day of the month, or the weekday or the weekend day.

13. The vehicle of claim 9, wherein the at least one processor is further configured to:
   determine, based at least in part on detecting a charging operation of the electric vehicle, a charging location of the electric vehicle and a charging start time;
   generate, for the electric vehicle, one of multiple charging profiles based on the charging location and the charging start time; and
   store the one of the multiple charging profiles for subsequent selection during driving of the electric vehicle.

14. The vehicle of claim 13, wherein the charging profile corresponds to the one of the multiple charging profiles.

15. The vehicle of claim 13, wherein the at least one processor is configured to generate the one of the multiple charging profiles at least in part by updating at least a profile location and a profile time period of the one of the multiple charging profiles based on the charging location and the charging start time.

16. The vehicle of claim 9, wherein the at least one processor is configured to perform the one or more functions at least in part by providing a reminder to charge the electric vehicle upon or before arrival at a charging location associated with the charging profile.

17. A non-transitory computer-readable medium storing computer executable code for operating an electric vehicle according to a charging profile, the code comprising code for:
   determining, by a processor in the electric vehicle while driving an electric vehicle, a location of the electric vehicle and a time period corresponding to the location of the electric vehicle;
   selecting, by the processor in the electric vehicle while driving the electric vehicle and based at least in part on the location and the time period, the charging profile for the electric vehicle, wherein the charging profile relates to performing a charging operation for the electric vehicle based on arriving at an associated profile location; and
   performing, by the processor in the electric vehicle, while driving the electric vehicle, and based on selecting the charging profile, one or more functions corresponding to the charging profile.

18. The non-transitory computer-readable medium of claim 17, wherein the code for selecting selects the charging profile based at least in part on determining the charging profile from multiple charging profiles as being associated with the associated profile location within a threshold distance of the location and as being associated with at least one profile time period within a threshold time difference of the time period.

19. The non-transitory computer-readable medium of claim 17, wherein the code for determining determines the location of the electric vehicle at least in part by predicting the location of the electric vehicle based on determining at least one of a global positioning system (GPS) position of the electric vehicle, a direction of travel of the electric vehicle, or a speed or acceleration of the electric vehicle.

20. The non-transitory computer-readable medium of claim 17, wherein the time period indicates at least one of a time of day, a day of a week, a day of a month, or a day as being a weekday or a weekend day, and wherein the code for selecting selects the charging profile based at least in part on determining the charging profile from multiple charging profiles as being associated with the time of day, the day of the week, the day of the month, or the weekday or the weekend day.

* * * * *